US010636086B2

(12) United States Patent
Goyal et al.

(10) Patent No.: US 10,636,086 B2
(45) Date of Patent: Apr. 28, 2020

(54) XBRL COMPARATIVE REPORTING

(71) Applicant: Oracle International Corporation, Redwood Shores, CA (US)

(72) Inventors: Amit Goyal, E. Palo Alto, CA (US); Saurabh Verma, Cupertino, CA (US); Ramy Yanetz, San Ramon, CA (US); Mahendra Kumar, Cupertino, CA (US); Vijay Aggarwal, Schwenksville, PA (US)

(73) Assignee: Oracle International Corporation, Redwood Shores, CA (US)

( * ) Notice: Subject to any disclaimer, the term of this patent is extended or adjusted under 35 U.S.C. 154(b) by 382 days.

(21) Appl. No.: 15/251,992

(22) Filed: Aug. 30, 2016

(65) Prior Publication Data

US 2017/0069020 A1   Mar. 9, 2017

Related U.S. Application Data

(60) Provisional application No. 62/214,891, filed on Sep. 4, 2015.

(51) Int. Cl.
*G06Q 40/02* (2012.01)

(52) U.S. Cl.
CPC ................... *G06Q 40/02* (2013.01)

(58) Field of Classification Search
CPC ................................................. G06Q 40/02
See application file for complete search history.

(56) References Cited

U.S. PATENT DOCUMENTS

| 9,146,912 B1* | 9/2015 | Benjamin | G06F 17/2264 |
| 2005/0027681 A1* | 2/2005 | Bernstein | G06F 16/86 |
| 2005/0197931 A1* | 9/2005 | Gupta | G06Q 40/00 705/30 |
| 2006/0184539 A1* | 8/2006 | Blake | G06F 17/243 |
| 2006/0242181 A1* | 10/2006 | Mueller-Klingspor | G06F 17/30917 |
| 2006/0242624 A1* | 10/2006 | Mueller-Klingspor | G06F 17/30731 717/114 |
| 2007/0011175 A1* | 1/2007 | Langseth | G06F 16/254 |
| 2009/0006472 A1* | 1/2009 | Bush | G06F 17/2247 |
| 2012/0239610 A1* | 9/2012 | Binstock | G06F 16/283 707/602 |

OTHER PUBLICATIONS

Wenger, Mitchell R., "A tour of five XBRL tools", Journal of Accountancy, Apr. 1, 2013. (Year: 2013).*
Calcbench Online Premium Suite Overview, retrieved from the internet: https://www.calcbench.com/home/products_overview, © 2017, 1 page.
U.S. Appl. No. 62/214,891, filed Sep. 4, 2015.

* cited by examiner

*Primary Examiner* — Eric T Wong

(74) *Attorney, Agent, or Firm* — Kilpatrick Townsend & Stockton LLP

(57) ABSTRACT

A comparative reporting system provides financial benchmarking and analytics. Integrating public reporting and enterprise software systems, raw financial information from external sources derived from a plurality of reporting sources can be ingested and processed to extract attributes and metrics. The extracted attributes and metrics can be data warehoused together with financial information from the enterprise software system. Analytics can be performed to generate a comparison between the enterprise and the plurality of reporting sources.

20 Claims, 12 Drawing Sheets

XBRL COMPARATIVE REPORTING

CROSS REFERENCES TO RELATED APPLICATIONS

This application claims benefit and priority under 35 U.S.C. § 119(e) to U.S. Provisional Application No. 62/214,891, filed Sep. 4, 2015, entitled "XBRL COMPARATIVE REPORTING" the entire contents of which is incorporated herein by reference for all purposes.

BACKGROUND

Accurate forecasts of corporate financial performance are highly valued by enterprises as inputs to internal decisions as wells as by investors as inputs for investment decisions. For investors, an enterprise's financial performance can directly determine investment returns, as when profits are distributed to shareholders as dividends or when a firm declares bankruptcy after running out of cash. The enterprise's financial performance can also influence investment returns by changing perceptions about the enterprises inherent value, as when investors bid up the price of a stock when its earnings per share were higher than expected.

The importance to investors of accurate information about financial performance is underscored by government requirements for public companies to disclose, audit, and certify financial statements on a regular basis. In the United States, the Security and Exchange Commission (SEC) requires publicly traded U.S. corporations to file financial reports quarterly following generally accepted accounting principles (GAAP). GAAP financial reports are a common language for investors, analysts, auditors, and management to describe the performance of a firm. A public repository of historic financial statements for companies traded in the United States is maintained at The United States Securities and Exchange Commission Electronic Data Gathering, Analysis and Retrieval (SEC EDGAR).

Typically, a GAAP financial report comprises a firm's Income Statement, Balance Sheet, and Statement of Cash Flows, as well as notes from the firm's management, for a particular accounting period. The usual accounting period in the U.S. is a fiscal quarter, and the SEC requires U.S. public companies to file financial statements quarterly. The Income Statement summarizes revenues & costs of goods sold, operating expenses, and the resulting overall profits or losses during the period covered by the financial statement. The Balance Sheet summarizes the firm's assets and liabilities at the end of the period covered by the financial statement. The Statement of Cash Flows summarizes the increase or decrease in the firm's cash over the period covered by the financial statement associated with profits, losses, investments, and other financial activities. Whereas the Income Statement and Statement of Cash Flows describe change or increments in quantities over the course of the accounting period, the Balance Sheet describes a snapshot of the firm's accounts and inventories at the end of the accounting period. Such an elaborate structure has evolved because none of the individual components alone provides an accurate view. The importance to investors of understanding each of the components comprising a GAAP financial statement is underscored by the requirement by the SEC for firms to provide a full GAAP report every quarter.

Much of the rest of the world uses the International Financial Reporting Standards (IFRS) instead of GAAP as the accounting standard. An IFRS report has a similar structure but also includes either a statement of changes in equity or a statement of recognized income or expense. In general, the components of a financial statement, whether GAAP or IRFS, whether the Income Statement, Balance Sheet, etc., comprise a set of numerical line items. Some line items can be derived from others. For example, Gross Margins, a line item commonly provided on the Income Statement, can be derived by subtracting the Cost of Goods Sold from Total Operating Revenues, two other line times from the Income Statement. Likewise, if one knows Total Operating Revenues and Gross Margins, one can derive the Cost of Goods Sold.

Additionally, macroeconomic data is created by institutions such as government agencies in analogous form to the financial statements of companies. For example, the Gross Domestic Product of a country is analogous to line items from the Income Statements of a firm. Like the line items of the financial statements of firms, some macroeconomic data is also definitionally related to other macroeconomic data. Public repositories of macroeconomic data also exist. For example, the Federal Reserve Bank of St. Louis provides a repository of historic U.S. macroeconomic data. Historic macroeconomic data is typically displayed as a set of line items.

Fortunately for investors, publicly available financial reports, together with publicly available macroeconomic data, provide a wealth of information that can be used to create financial forecasts. This information includes not only financial reports for the given firm over long history of accounting periods, but also financial reports from thousands of other firms. Nevertheless, most enterprises lack the means to create competitive forecasts from this wealth of information or to identify correlations resulting from jointly determined behavior. Software tools or services are not available to enterprises today for this purpose.

Accordingly, what is desired is to solve problems relating to processing large datasets of financial information available from publically accessible sources for purposes of business intelligence and comparative analysis, some of which may be discussed herein. Additionally, what is desired is to reduce drawbacks relating to integrating the reported financial information of competing enterprises into financial systems of an enterprise, some of which may be discussed herein.

BRIEF SUMMARY

The following portion of this disclosure presents a simplified summary of one or more innovations, embodiments, and/or examples found within this disclosure for at least the purpose of providing a basic understanding of the subject matter. This summary does not attempt to provide an extensive overview of any particular embodiment or example. Additionally, this summary is not intended to identify key/critical elements of an embodiment or example or to delineate the scope of the subject matter of this disclosure. Accordingly, one purpose of this summary may be to present some innovations, embodiments, and/or examples found within this disclosure in a simplified form as a prelude to a more detailed description presented later.

Competitive benchmarking is a process in which the activities of a given company are measured against the best practices of other, best-in-class companies. In the process of competitive benchmarking, internal functions are analyzed and measured using financial (i.e. quantitative) and/or non-financial (i.e. qualitative) yardsticks. Functions measured from one company are compared with similar functions measured from leading competitors, or they are compared with the best practices in other industries.

A comparative reporting system provides financial benchmarking and analytics. Integrating public reporting and enterprise software systems, raw financial information from external sources derived from a plurality of reporting sources can be ingested and processed to extract attributes and metrics. The extracted attributes and metrics can be data warehoused together with financial information from the enterprise software system. Analytics can be performed to generate a comparison between the enterprise and the plurality of reporting sources.

In some examples, a computer-implemented method, a system, and/or a computer-readable medium may include receiving a financial report made of a first organization reporting first financial information, where the financial report structured according to a predetermined reporting language. The method, system, and/or computer-readable medium may also include processing the financial report to extract first financial information using a set of data rules. Additionally, in some aspects, the method, system, and/or computer-readable medium may also include integrating the extracted first financial information with second financial information from a second organization. Additionally, the method, system, and/or computer-readable medium may include receiving one or more comparison metrics. Further, in some examples, the method, system, and/or computer-readable medium may also include performing one or more comparative analytics between the extracted first financial information for the first organization and the second financial information for the second organization using the one or more comparative metrics and/or generating comparison information transforming the first financial information for the first organization and the second financial information for the second organization into a format indicative of results of the one or more comparative analytics.

In at least some examples, the predetermined reporting language may comprise eXtensible Business Reporting Language (XBRL), the financial report may be received from a Securities Exchange Commission (SEC) server, and/or the first financial information may comprise publically available information published on a web page served by the SEC server. In some examples, processing the financial report to extract the first financial information using the set of data rules may comprises partitioning the first financial information into a plurality of slices and/or extracting the first financial information according to the plurality of slices. Additionally, in some cases, integrating the extracted first financial information with the second financial information from the second orgApproeanization may comprise executing a data flow that stores the first financial information and the second financial information in the data warehouse and/or may comprise executing the data flow between a big data source and a data warehouse where the extracted first financial information may be stored in key value pairs. Further, integrating the extracted first financial information with the second financial information from the second organization may comprise executing a data flow between a relational database and a data warehouse, where the extracted first financial information may be mapped to one or more database tables using the data rules.

A further understanding of the nature of and equivalents to the subject matter of this disclosure (as well as any inherent or express advantages and improvements provided) should be realized in addition to the above section by reference to the remaining portions of this disclosure, any accompanying drawings, and the claims.

BRIEF DESCRIPTION OF THE DRAWINGS

In order to reasonably describe and illustrate those innovations, embodiments, and/or examples found within this disclosure, reference may be made to one or more accompanying drawings. The additional details or examples used to describe the one or more accompanying drawings should not be considered as limitations to the scope of any of the claimed disclosures, any of the presently described embodiments and/or examples, or the presently understood best mode of any innovations presented within this disclosure.

DETAILED DESCRIPTION

Figure 1:
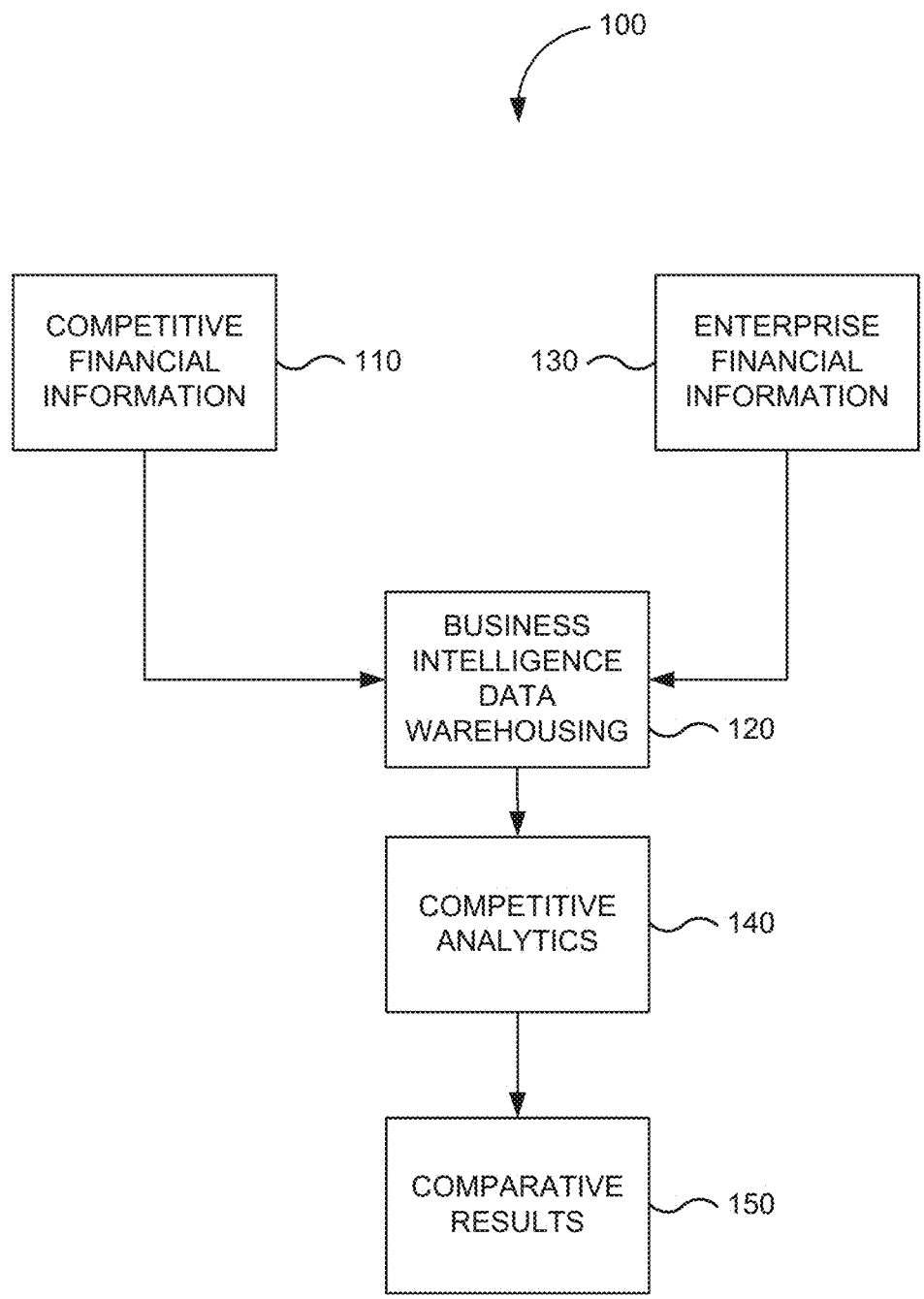
FIG. 1 is a block diagram for scalable data integration and processing for competitive analytics according to one embodiment of the present disclosure.

Embodiments are directed to a comparative reporting system that provides financial benchmarking and analytics for an enterprise. Financial information derived from a plurality of reporting sources can be ingested and processed to extract attributes and metrics. The extracted attributes and metrics can be data warehoused together with financial information from the enterprise's financial software system. A data integration strategy can be implemented to make storage decisions about the number of competitors being analyzed, aspects of the financial information considered relevant, as well as metrics sought to be derived from the financial information and used in subsequent analytics. Analytics can be performed to generate a comparison between financial information of the enterprise and that of the plurality of reporting sources.

In some examples, the embodiments can deliver a robust framework to benchmark performance in the financials, procurement, and human capital areas against external data sources, such as public companies, market indices and macroeconomic indicators. Extracted benchmarking data can then be made available in the data warehouse and can be compared against current internal OLTP data available in the data warehouse. In some instances, a drill down into warehouse data and other financial dashboards can be performed to explore further or investigate reasons for variance. In some examples, the embodiments described herein may generate and compare derived metrics (such as percent of revenue, YoY changes, key ratios and index based trends) in addition to the SEC base metrics, to provide additional insights. In some examples, the embodiments may be configured to calculate Q4 data which is not available in the SEC data.

Introduction

In the following description, for the purposes of explanation, specific details are set forth in order to provide a thorough understanding of embodiments of the disclosure. However, it will be apparent that various embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments. The figures and description are not intended to be restrictive. Rather, the ensuing description of the exemplary embodiments will provide those skilled in the art with an enabling description for implementing an exemplary embodiment. It should be understood that various changes may be made in the function and arrangement of elements without departing from the spirit and scope of the disclosure as set forth in the appended claims.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" or "computer-readable medium" includes, but is not limited to, portable or non-portable storage devices, optical storage devices, wireless channels, and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable or computer-readable medium. One or more processors may perform the necessary tasks.

Systems depicted in some of the figures may be provided in various configurations. In some embodiments, the systems may be configured as a distributed system where one or more components of the system are distributed across one or more networks in a cloud computing system. In further embodiments, the systems may be configured as a single system where one or more components of the system incorporated into a single structure or package.

FIG. 1 is a block diagram for scalable data integration and processing for competitive analytics according to one embodiment of the present disclosure. FIG. 1 may merely be illustrative of an embodiment or implementation of the disclosure described herein and should not limit the scope of any of the claims. One of ordinary skill in the art may recognize through this disclosure and the teachings presented herein other variations, modifications, and/or alternatives to those embodiments or implementations illustrated in the figures.

Embodiments of the present disclosure thus provide methods and systems for automating integration of XML, and XBRL compliant financial data from publically available sources into enterprise financial and business intelligence systems. In one embodiment, competitive financial information 110 can include corporate financial data for one or more companies retrieved from one or more publically available data sources, such as the SEC (e.g., at www.SEC.gov). Competitive financial information 110 can include an XBRL instance document including a dataset. An XBRL instance document is an XML document that contains a list of elements and values. In some examples, a list of companies, metrics, and Fiscal periods may be downloaded from a configuration manager. The download may be facilitated by a Business Intelligence (BI) plugin. In some cases, the configuration manager is a tool that may be utilized by a customer to configure the source of data they want to extract (e.g., the SEC website or the like). The configuration manager may also enable configuration (by the user) of the list of companies, metrics, and/or fiscal periods of interest.

Extraction of the data can be challenging as there is a loose format of the data within XBRL. For example, different companies may label similar metrics with different labels or names. Therefore, the data needs to be mapped appropriately so that it can be compared with similar metrics, even if the labels are different. XBRL essentially enables name-value pairs using tags to store the financial information. However, the names and/or tags used by one company might not be the same as that of another company. Thus, the extractor needs to be able to map similar metrics (with different names and/or tags) to the same metric. The mapping may be need to be performed manually (e.g., the user may identify which tags from which companies should be mapped to which name-value pairs). In some cases, the mappings may be generated automatically. For example, a closest match for each name and/or tag associated with each metric may be predicted. The closest match may be automatically used, or the user may be presented with the closest match as a pre-seeded value, and given the ability to select (accept) or reject the prediction. In some cases, a machine-learning algorithm may be used to programmatically learn name-value pairs for particular companies, and the system may be configured to automatically use the learned tags for extracting and/or mapping the metrics.

An XBRL user interface (UI) may be provided that can enable users to access the configuration manager and identify companies and respective tags to download. Additionally, the UI may present pre-seeded tags (e.g., the most common tags used), and can allow the user to select the seeded tags or to manually enter their own tags (or tags that are known to be associated with a selected company. Once the mapping exercise is completed, the system can download the data from the source to a Source Dependent Schema (SDS), which is essentially a staging area that stores the data. In some examples, a Cloud Replicator framework may be utilized for implementing this functionality. In some cases, a structured XBRL document can be created from unstructured XBRL data. In other words, the different tags for different companies can be equalized (e.g., normalized) into a common tag, and then the common tags can be used to benchmark against a user's internal data.

In some embodiments, the Cloud Replicator may be configured to load a metric mapping. A label file can then be parsed to find labels in the metric mapping and XBRL tags can be derived for each label. Once downloaded, the instance document can be parsed for each tag for a current (or defined) time period. The data can be stored in a data structure of the Cloud Replicator. A full load of data may include all companies, all metrics extracted from the start date. However, an incremental load may include all existing companies: all metrics extracted from the last load; new companies: all metrics extracted from the start date; and new mappings: any company whose mappings have changed from the start date will have all metrics extracted from the start date.

According to an embodiment of the present disclosure, a Business Intelligence (BI) data warehouse 120 may process the instance document. BI data warehouse 120 can include hardware and/or software elements that provide a federated repository for data that an enterprise's various business systems collect. BI data warehouse 120 can retrieve and evaluate the instance document's elements. BI data warehouse 120 can then integrate the instance document's elements with the enterprise's data, including enterprise financial information 130. Enterprise financial information 130 can be collected from one or more of the enterprises accounting or financial systems. In some examples, the customer accessing or requesting the analytics may be directly associated with enterprise financial information 130 (e.g., the customer may be an entity that hosts or otherwise operates the enterprise applications and/or processes).

Competitive analytics 140 performs one or more analytics using competitive financial information 110 and enterprise financial information 130. Competitive analytics 140 can include hardware and/or software elements that perform analytics and business intelligence. Competitive analytics 140 can make use of one or more comparison metrics (e.g., revenue, average inventory days, cash cycle) that show how the enterprise stack up against or compare with competitors, industry benchmarks, market conditions, or the like. Thus, a true indication of performance of the enterprise can be observed.

Comparative results 150 can include information generated by competitive analytics 140 that transforms competitive financial information 110 and enterprise financial information 130 into reports, dashboards, user interfaces, notifications, task lists, action items, or the like. Accordingly, an enterprise can make use of comparative results 150 to show how the enterprise stacks up against or compares with competitors, industry benchmarks, market conditions, or the like.

Figure 2:
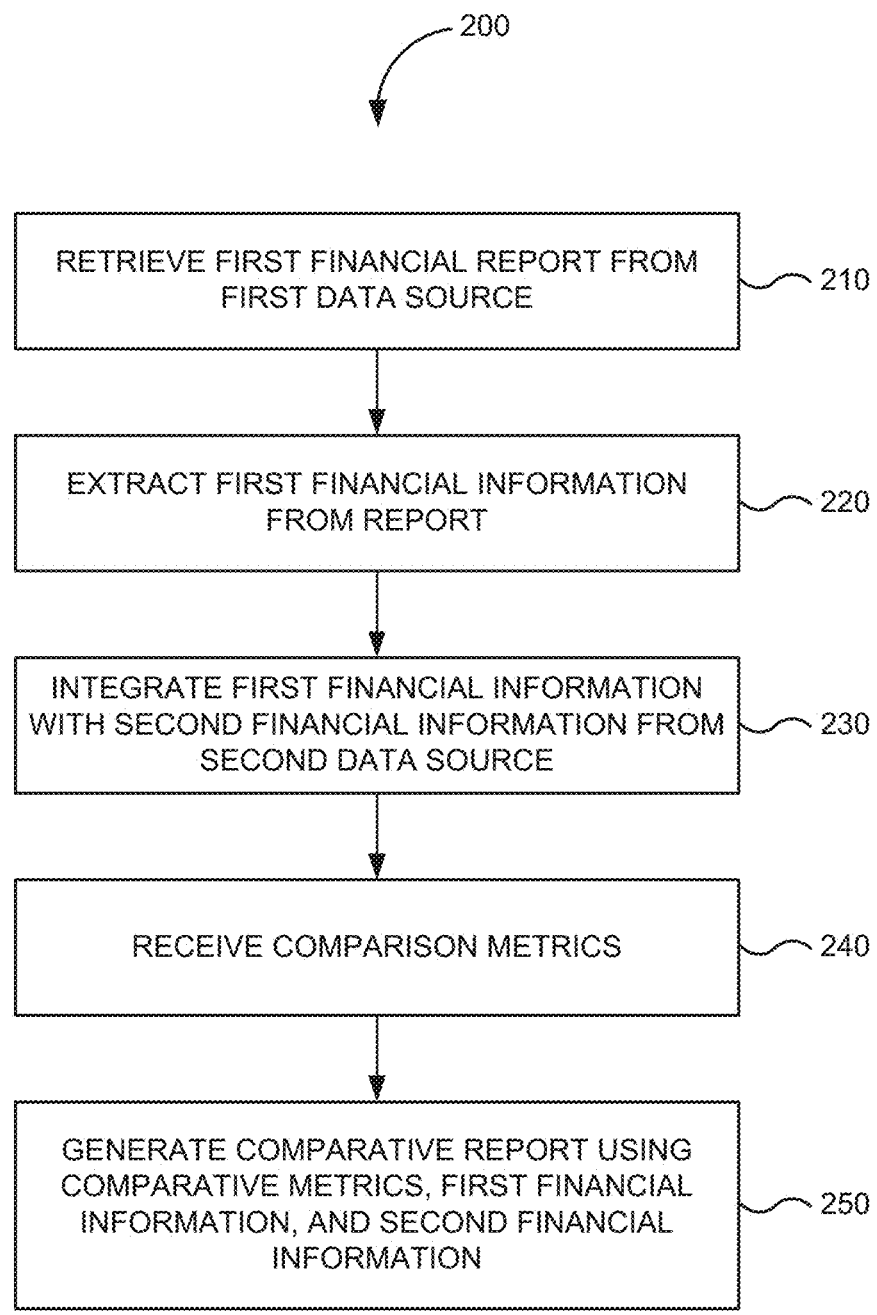
FIG. 2 is a flowchart of a method for generating comparative reports using competitive analytics in one embodiment according to the present disclosure.

FIG. 2 is a flowchart of method 200 for generating comparative reports using competitive analytics in one embodiment according to the present disclosure. Implementations of or processing in method 200 depicted in FIG. 2 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 200 depicted in FIG. 2 may begin at step 210.

In step 210, a first financial report is received from a first data source. The first financial report can include information that has been converted into standard XBRL. One source of information for the first financial report can be the SEC EDGAR database, where public companies disclose their financial as well as non-financial information in the form of regulatory filings (e.g., in HTML, XBRL, Text, and PDF formats). Another source of information for the first financial report can include private company filings, news, research reports/opinions, reports on market trends and benchmarks, financial discussions, forums, blogs, stock prices, market situations, macro-economic data such as treasury-bill rates, currency exchange rates, LIBOR rates, etc.

In step 220, first financial information is extracted from the first financial report. Typically, companies reporting financial information are guided by standards set by the Financial Accounting Standard Board (FASB) and utilize eXtensible Business Reporting Language (XBRL) as a standard means of communicating, and thus normalizing, financial information reporting. Information gathered from varied sources (in varied forms) can be harvested on a regular basis and can be organized using one or more data maps to extract the first financial information. Categories of information can include qualitative and quantitative competitor data, industry data, market data, macro-economic data, etc. Data extraction and standardization systems (e.g., software modules) can be fed the data and determine one or more logical slices or partitions of the financial data based at least in part on its utility in competitive financial analysis. Some different aspects that can be extracted are income statements, balance sheets, cash flow statements, pensions, income taxes, stock options, reserve accounts, debt accounts, segmental information, and/or off-balance sheet items.

In one embodiment, data items that have been harvested are processed to retrieve relevant and standardized information for analysis. Extraction of data items can be based at least in part on data rules that define aspects to be extracted. These data rules can specify line items, elements, or other attributes as reported in the first financial report. The first financial report can be parsed based at least in part on the data rules.

In step 230, the first financial information is integrated with second financial information from a second data source. In one embodiment, a data warehouse can cleanse and transform the first financial information and the second financial information to properly represent the information to produce accurate results based at least in part on the queries used to analyze a competitive environment. The data warehouse can be refreshed on a regular basis. For example, financial information can be periodically harvested from one or more external sources and one or more enterprise sources.

In one aspect, a first phase loads data sets that are used to populate one or more dimension tables in the data warehouse. A dimension table stores descriptive information that qualifies a fact. A second phase loads data sets that are used to populate the fact tables. A fact table contains data columns for the numeric measurements.

Transforms can perform custom operations on ingested data. Data receive from multiple sources can be in a variety of formats. Data from these data sources can be transformed and integrated into standard structures for the data warehouse. A data flow plan having a set of complex instructions can be used to extract, transform, and load the data into the data warehouse. Several data flow plans may be required for each data set.

In step 240, one or more comparison metrics are received. Some examples of comparison metrics can include revenue, average inventory days, cash cycle, or the like. A comparison metric can include a custom function that derives a comparative result from evaluating a plurality of elements within the first financial information and the second financial information.

In step 250, a comparative report is generated using the one or more comparative metrics, the first financial information, and the second financial information. This allows an enterprise to compare core financial metrics with its competitors (e.g., revenue, average inventory days, cash cycle, etc.). The enterprise can view how the organization stacks up against competitors as well as viewing a true indication of performance.

Figure 3:
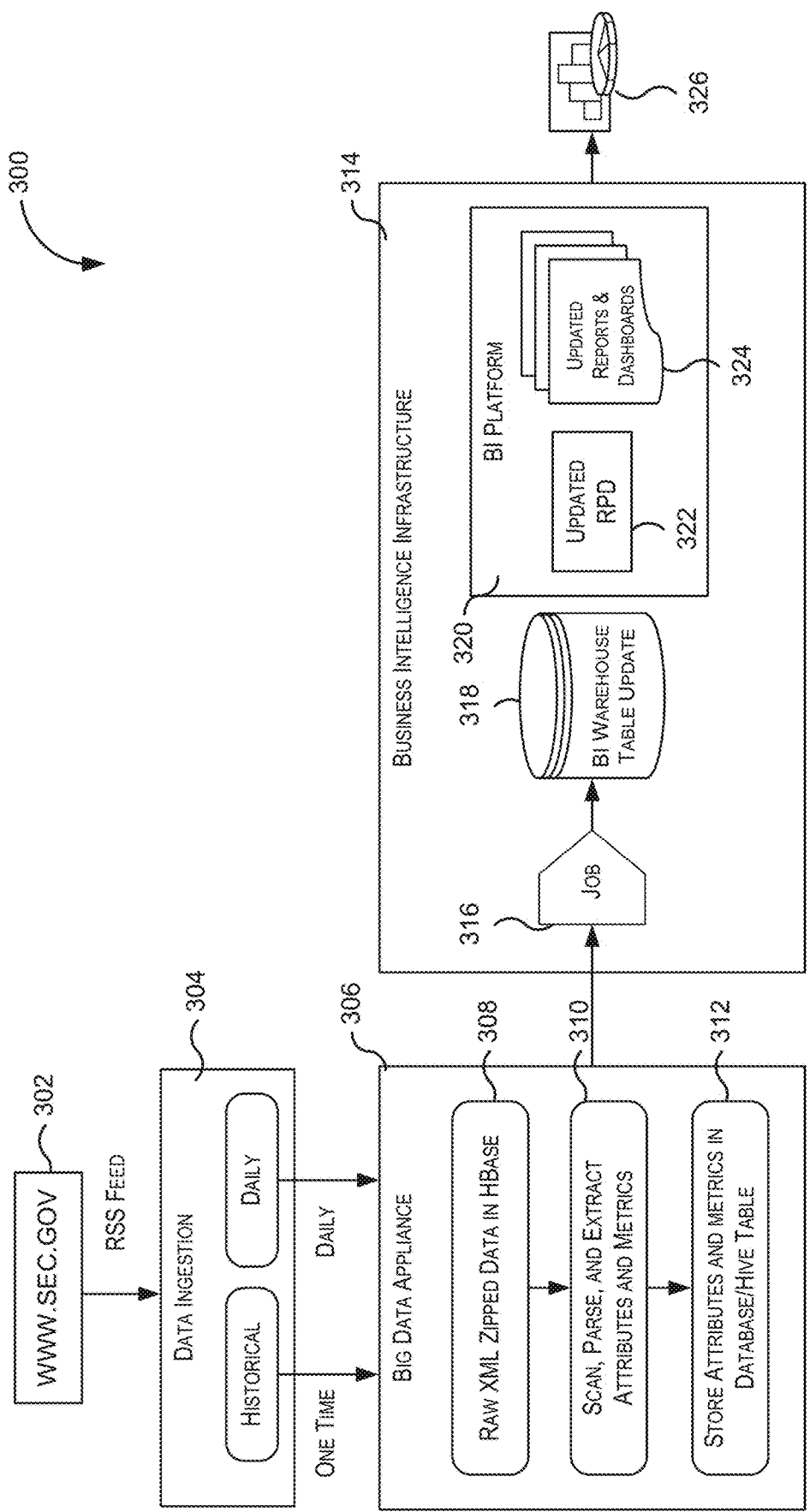
FIG. 3 is an illustration of a big data system for scalable data integration and processing for competitive analytics according to the present disclosure.

FIG. 3 is an illustration of a system 300 (e.g., a big data system or a data warehouse system) for scalable data integration and processing for competitive analytics according to the present disclosure. System 300 can be used to integrate large volumes of data from external sources.

In this example, data is obtained from the SEC website 302 (or any other website or source) using one or more RSS feeds fed into data ingestion 304. Data ingestion 304 can include hardware and/or software that takes historical and/or daily information from the RSS feeds and provides the data to big data appliance 306.

Appliance 306 (e.g., a big data appliance or a data warehouse appliance) can include hardware and/or software that extracts financial information from the RSS feeds and prepares the information for loading to an enterprises data warehouse or business intelligence application. For example, in block 308, the raw XML zipped data can be stored in HBase. In block 310, the raw XML is scanned, parsed, and attributes and metrics are extracted. In block 312, the extracted attributes and metrics are stored in a database or hive table in preparation for onboarding into BI Infrastructure 314.

BI Infrastructure 314 can include hardware and/or software that integrates the data from the SEC website and an enterprise's financial information. BI Infrastructure 314 can further perform analytics on the integrated data to generate competitive reports showing comparisons between one or more selected competitors, industries, market segments, etc. and the enterprise.

In block 316, a data integration flow (e.g., using Oracle Data Integration Suite) can use an Extract Transform Load (ETL) or ETL job sourcing the data from big data appliance 306 and targeting BI warehouse tables 318. BI Platform 320 can include a business intelligence application that utilizes BI warehouse tables 318 to generate reports, dashboards, spreadsheets, notifications, or the like that include comparative results between the companies providing the data to the SEC website and the enterprise. In this example, in block 322 the Repository Database (RPD) is updated that includes data definitions and business rules known as "metadata." The RPD includes a physical layer that represents the actual tables and columns of a database/data source. It also contains the connection definition to that database, or data source. The RPD further includes a business model mapping layer that is defined in the physical layer. The RPD further includes a presentation layer that presents the tables and columns to end users. The main purpose of the presentation layer is to organize comparative content for users in a way that is most meaningful in block 324. In block 326, the comparative content can be exported from BI Platform 320 in reports, documents, spreadsheets, notifications, etc.

Figure 4:
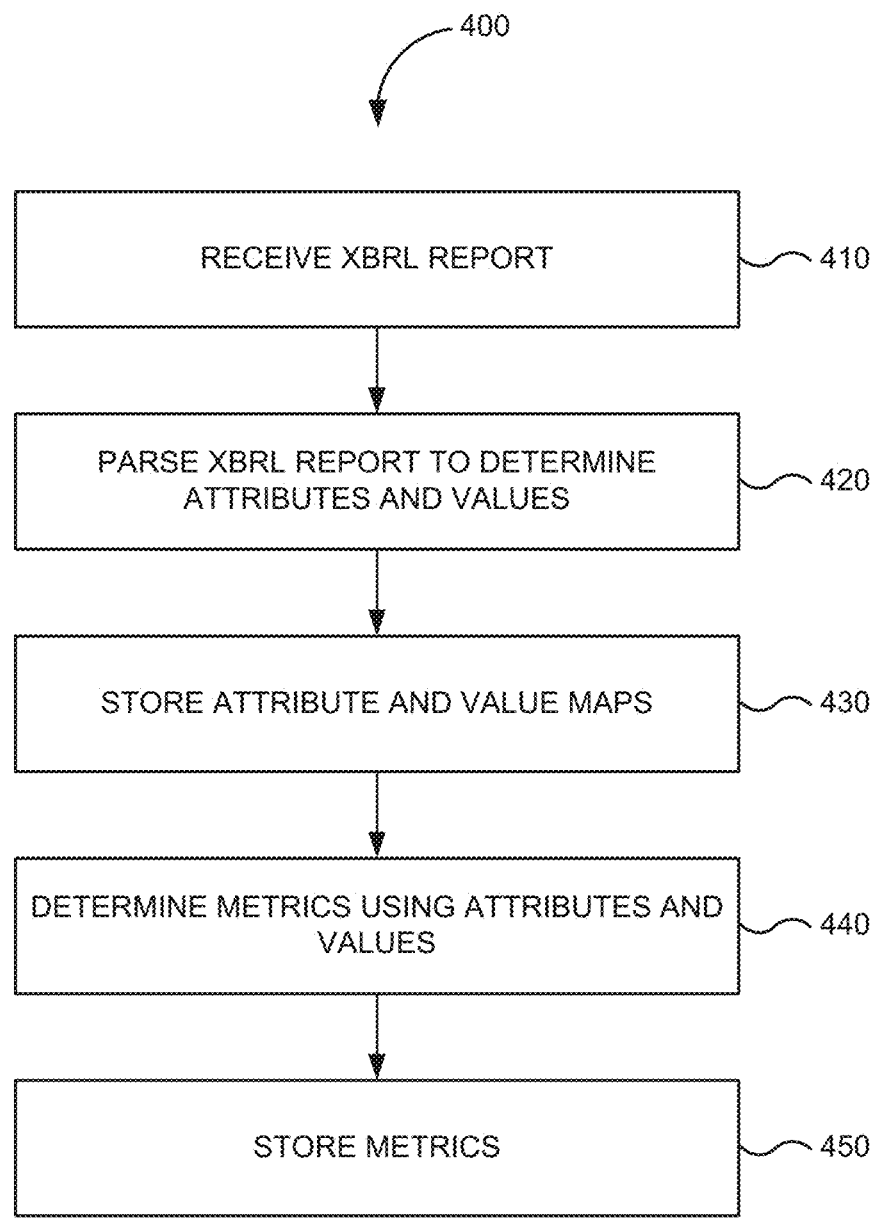
FIG. 4 is a flowchart of a method for extracting financial information using the big data system of FIG. 3 in one embodiment according to the present disclosure.

FIG. 4 is a flowchart of method 400 for extracting financial information using system 300 of FIG. 3 in one embodiment according to the present disclosure. Implementations of or processing in method 400 depicted in FIG. 4 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 400 depicted in FIG. 4 may begin at step 410.

In step 410, an XBRL report is received from the SEC website or other source. The XBRL can include financial information for one or more companies. This can include publically available 10k & 10q filings of companies. In step 420, the XBRL report is parsed to determine attributes and values. In step 430, the attributes and values are stored using one or more data maps.

In step 440, one or more metrics are determined. Metrics can include revenue, average inventory days, cash cycle, or the like and be derived from the extracted attributes and values. In step 450, the metrics are stored. Accordingly, system 300 can store large quantities of sparse data.

Figure 5:
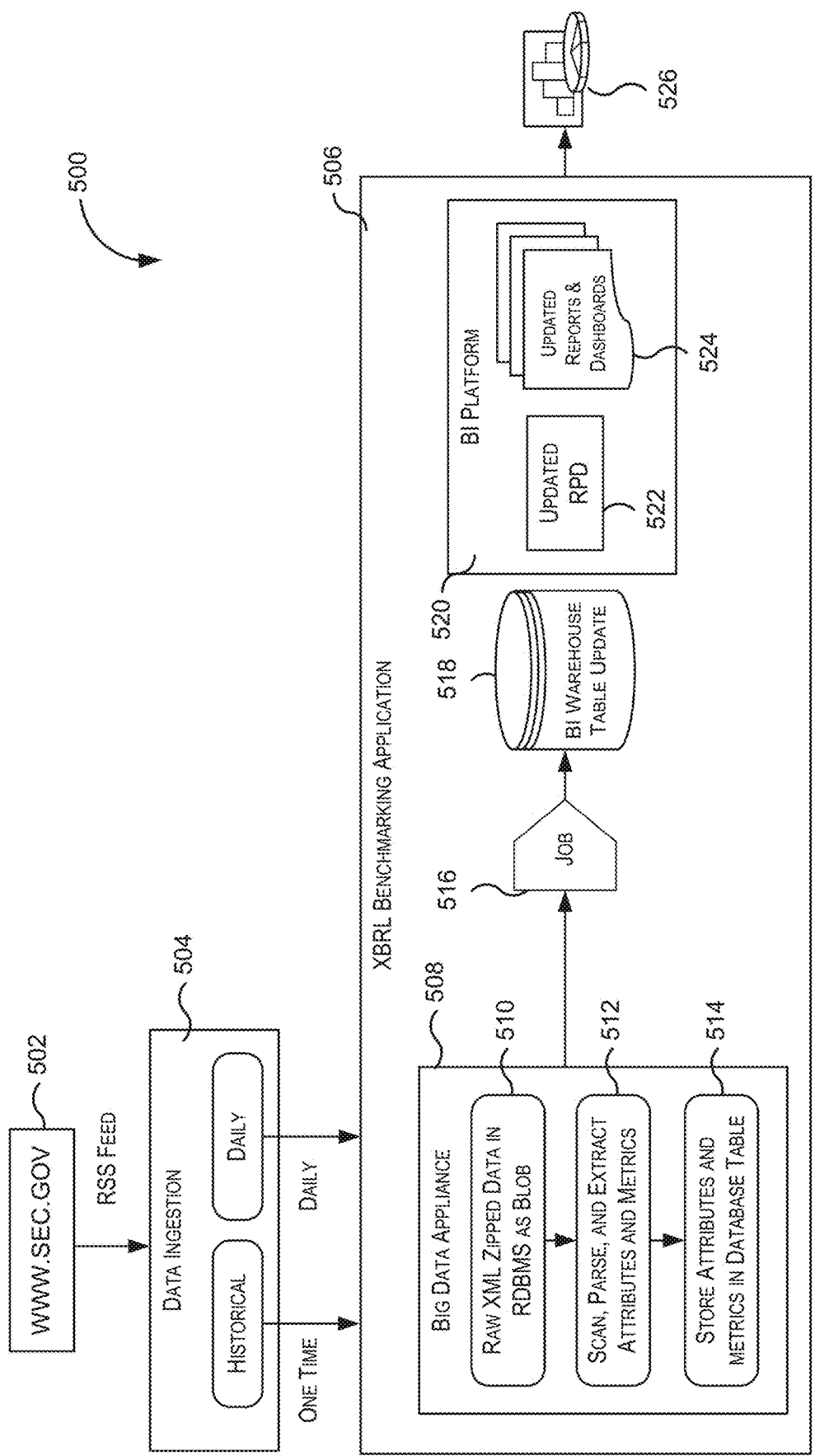
FIG. 5 is an illustration of a benchmarking system for scalable data integration and processing for competitive analytics according to the present disclosure.

FIG. 5 is an illustration of benchmarking system 500 for scalable data integration and processing for competitive analytics according to the present disclosure. Benchmarking system 500 can provide a relational architecture used to integrate data from external sources.

In this example, data is obtained from the SEC website 502 using one or more RSS feeds fed into data ingestion 504. Data ingestion 504 can include hardware and/or software that takes historical and/or daily information from the RSS feeds and provide the data to XBRL benchmarking application 506.

XBRL benchmarking appliance 506 can include hardware and/or software that extracts financial information from the RSS feeds and prepares the information for loading to an enterprises data warehouse or business intelligence application. For example, in XBRL processing block 508, the raw XML zipped data is stored in a relational database as a Binary Large Object (BLOB) or can be processed in memory, in block 510. In block 512, the raw XML is scanned, parsed, and attributes and metrics are extracted. In block 514, the extracted attributes and metrics are stored in one or more database tables.

In block 516, a data integration flow (e.g., using Oracle Data Integration Suite) can use an ETL or ETL job sourcing the data staged in the database tables and targeting BI warehouse tables 518. BI Platform 520 can include a business intelligence application that utilizes BI warehouse tables 518 to generate reports, dashboards, spreadsheets, notifications, or the like that include comparative results between the companies providing the data to the SEC website and the enterprise. In this example, in block 522 the RPD is updated that includes data definitions and business rules known as "metadata." The RPD includes a physical layer that represents the actual tables and columns of a database/data source. It also contains the connection definition to that database, or data source. The RPD further includes a business model mapping layer that models that is defined in the physical layer. The RPD further includes a presentation layer that presents the tables and columns to end users. The main purpose of the presentation layer is to organize comparative content for users in a way that is most meaningful in block 524. In block 526, the comparative content can be exported from BI Platform 520 in reports, documents, spreadsheets, notifications, etc.

Figure 6:
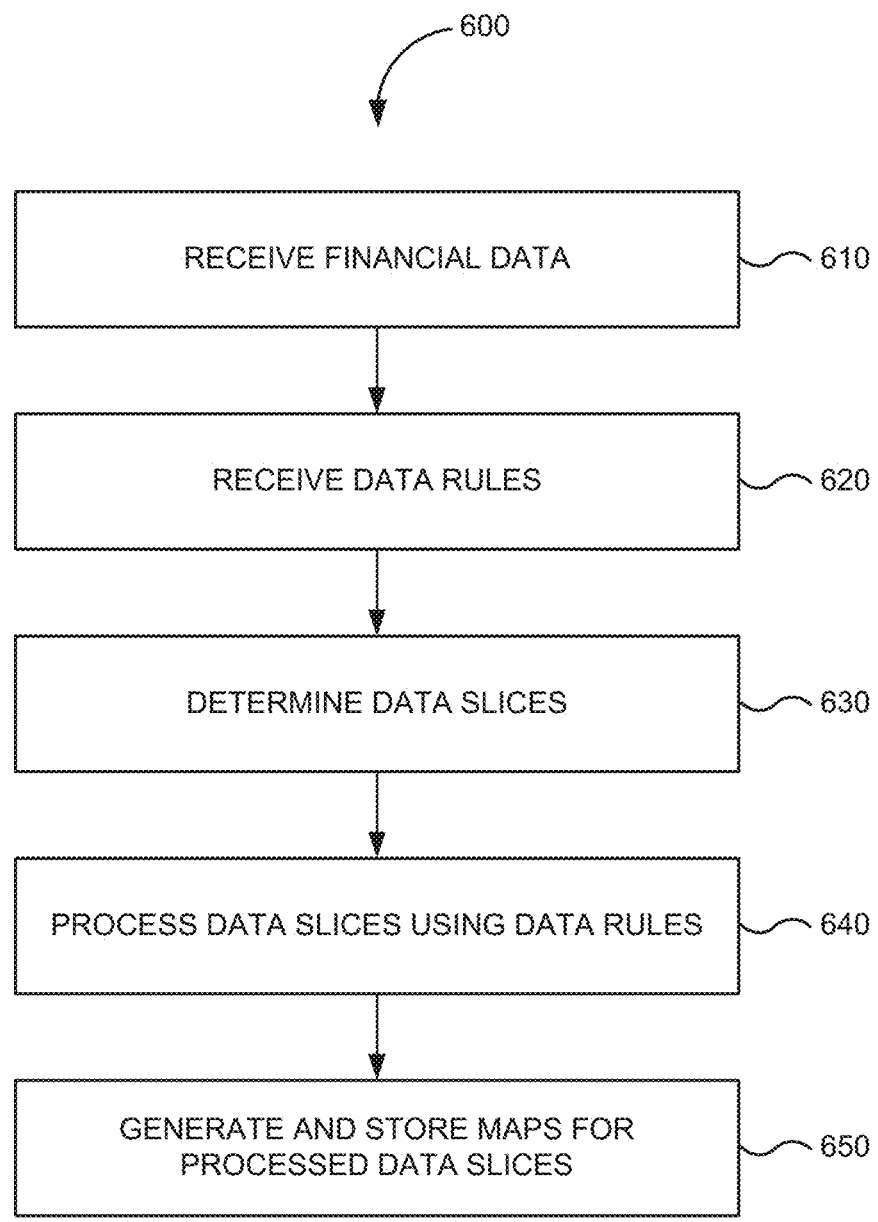
FIG. 6 is a flowchart of a method for processing competitive financial information using a set of data rules in one embodiment according to the present disclosure.

FIG. 6 is a flowchart of method 600 for processing competitive financial information using a set of data rules in one embodiment according to the present disclosure. Implementations of or processing in method 600 depicted in FIG. 6 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 600 depicted in FIG. 6 may begin at step 610.

In step 610, financial data is received. In step 620, one or more data rules are received. In one embodiment, a data rule can include one or more conditions which when satisfied indicate how the financial data is to be stored. In step 630, one or more data slices are determined. A slice partitions the data into one or more logical sets. In step 640, the data slices are processed using the data rules. In step 650, maps are generated and stored for the processed data slices. The maps can include key-value pairs sliced, parsed, and extracted from the financial data.

Accordingly, A financial benchmarking and analytics can be performed using the mapped data. Integrating public reporting and enterprise software systems, raw financial information from external sources derived from a plurality of reporting sources can be ingested and processed to extract attributes and metrics. The extracted attributes and metrics can be data warehoused together with financial information from the enterprise software system. Analytics can be performed to generate a comparison between the enterprise and the plurality of reporting sources.

Figure 7:
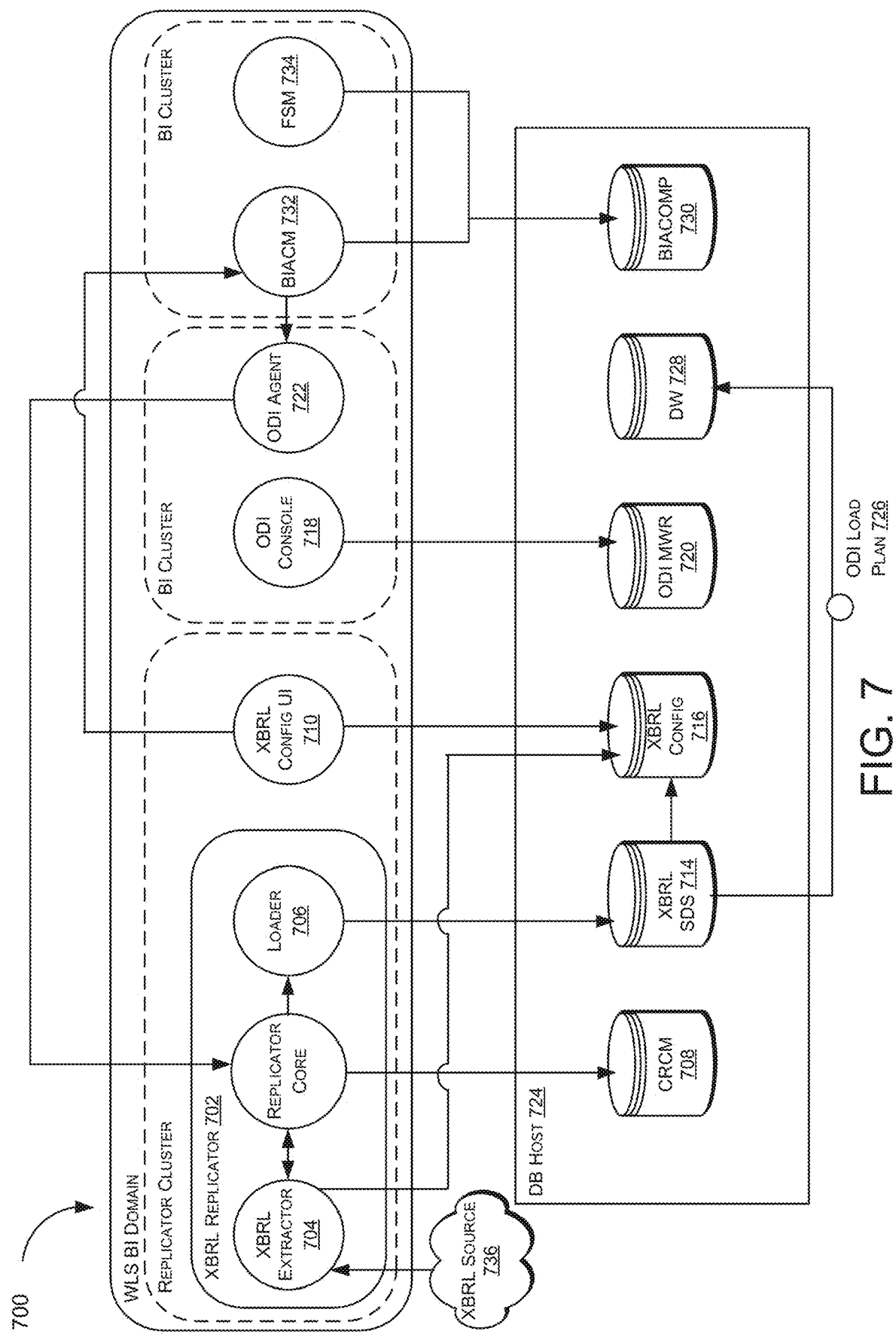
FIG. 7 is an architecture and flow diagram for scalable data integration and processing for competitive analytics in one embodiment according to the present disclosure.

FIG. 7 depicts a simplified diagram 700 for illustrating scalable data integration and processing for competitive analytics. In some examples, an XBRL Replicator or Taleo Replicator 702 (FIG. 7 illustrates an XBRL Replicator 702; however, any replicator including a Taleo Replicator may be used) is a core engine that is configured to orchestrate the replication process between extractor 704 and loader 706 modules. An XBRL extractor 704 may be a module that is configured to extract data from the SEC source as described above. A loader module 706 can be configured to load the data extracted from the extractor to the target. A Cloud Replicator Core Module (CRCM) 708 may be utilized within the host to replicate a cloud infrastructure. In some instances, an XBRL Config UI 710 may be embedded into a BI Apps Config Manager (BIACM) 712 web page as a plug-in. This provides a UI to enter a list of companies and metric mapping.

An XBRL Source Dependent Schema (SDS) 714 can contain the data extracted from the SEC as well as configuration data, and used as source for DI. An XBRL Config 716 can be used to contain the XBRL configuration data (e.g., companies, groups, metrics, mappings, etc.) and is actually part of the SDS schema. A Data Integrator (DI, for example, the Oracle Data Integrator (ODI)) Console 718 is the web interface that allows the user to navigate the objects stored in the DI Master/Work Repository (ODI MWR) 720. This allows users to run scenarios as agents.

An ODI Agent 722 can be a standalone or enterprise agent that runs sessions. It connects to the source and target data servers when processing integration sessions. ODI Master/Work Repository 720 is on the database host 724 and consists of the two schemas with one containing the master repository and the other containing the work repository. Master contains the topology and security whereas the work repository contains the development and run-time data (sessions/scenarios). Master repository contains all the connection information to the work repository. An ODI Load Plan 726 can be configured to orchestrate the ETL process. It calls the Cloud Connector which will populate the SDS tables using the Cloud Replicator/XBRL Extractor 704 and then initiates the ETL full load or incremental load process. In some instances, the data warehouse 728 contains the fact and dimension star schema tables which hold the data loaded by ODI, and is the source for the XBRL dashboard. The BI Apps Component (BIACOMP) Repository 730 contains the Config Manager Components. The BI Apps Config Manager (BIACM) 732 contains the XBRL config UI 710. The Functional Setup Manager (FSM) 734 can be used for configuring the replicator 702, registering the connection of the source 736, and generating the load plan 726 etc.

Figure 8:
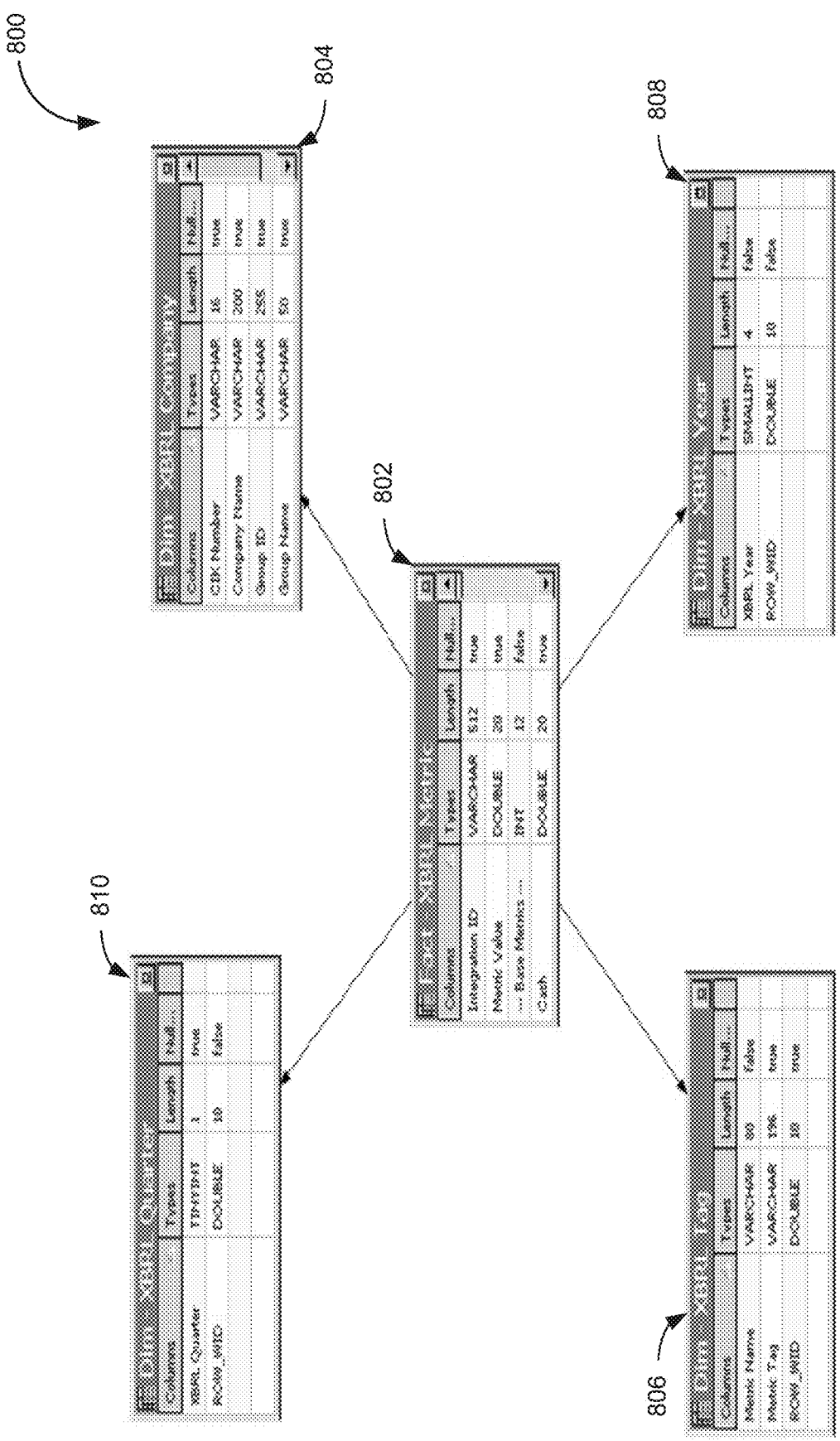
FIG. 8 is an illustration of the RPD data model logical star schema for competitive analytics in one embodiment according to the present disclosure.

FIG. 8 depicts a simplified diagram 800 for illustrating an RPD data model logical star schema for competitive analytics. In some examples, XBRL RPD Design for the XBRL subject area is represented as a star schema. At the RPD Business model and mapping (BMM) layer, there is a single XBRL Metric Fact 802 and the four dimensions are Company 804, Tag 806, Year 808, and Quarter 810. The dimension tables 804, 806, 808, 810 can be joined with the fact table 802 using ROW_WID. The following describes example makeups of the tables 802-810 shown in FIG. 8:

Fact—XBRL Metric 802: Contains the metric value as well as 40 common metrics provided by default metric name mapping. Those base metrics are pre-defined in the RPD. Metric Value key-value pairs in the physical Fact tables 802 are mapped to those metrics in the RPD. In addition there are 20 plus derived metrics such as percent of revenue, YoY changes, and key ratios which are also calculated in the RPD to provide additional insights.

Dim—XBRL Company 804: Contains company CIK number, name and group.

Figure 9:
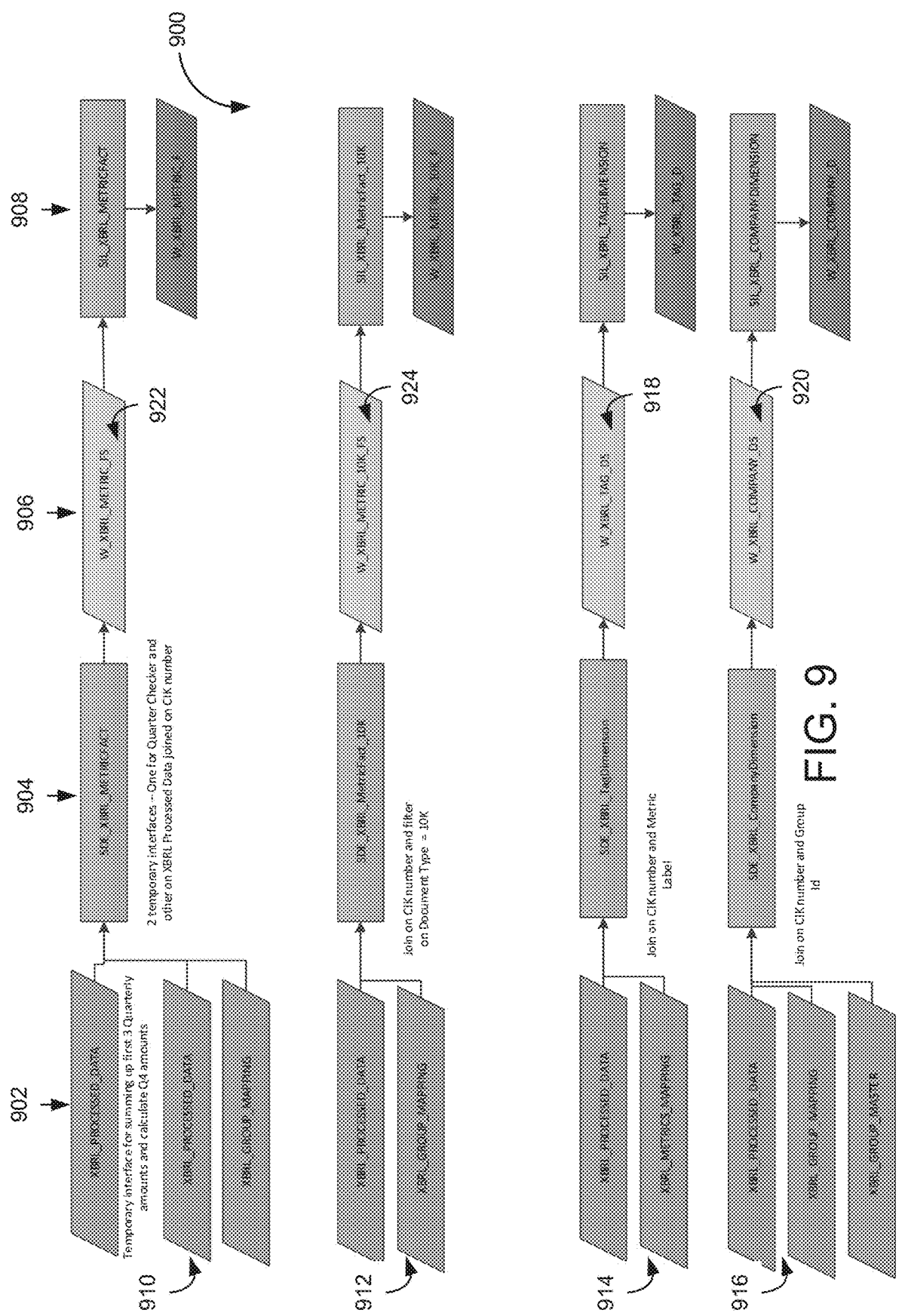
FIG. 9 is the ODI ETL flow diagram for data integration and processing for competitive analytics in one embodiment according to the present disclosure.

Dim—XBRL Tag 806: Contains the mapping between metrics and tags. There is one to many relationship between metric and tag Dim—XBRL Year 808: Contains the Fiscal Year Dim—XBRL Quarter 810: Contains the Fiscal Quarter FIG. 9 depicts a simplified diagram 900 for illustrating an ODI ETL flow diagram for data integration and processing for competitive analytics. The first column 902 of boxes represents the Source Dependent Schema (SDS) tables. In some examples, XBRL data is processed and/or XBRL groups are mapped in the first column 902. Additionally, a temporary interface may be configured to sum up the first three quarterly amounts of data and/or calculate Q4 amounts. The second column 904 represents Source Dependent Extract (SDE) interfaces. There may be two temporary interfaces configured to check Quarter data and/or to join XBRL processed data with a CIK number. The third column 906 represents staging tables. In the fourth column 908, the rectangular boxes represent Source Independent Load (SIL) interfaces and the parallelogram shaped boxes represent the target fact and dimension tables. In some cases, each separate row 910, 912, 914, 916 represents a different example flow for integrating and processing data.

Dimensions:
1) W_XBRL_TAG_DS 918
Stores metric tag and metric names.
2) W_XBRL_COMPANY_DS 920
Stores company name and unique ID of companies along with user configured group.

Facts:
1) W_XBRL_METRIC_FS 922
Grain of this table is company's metric value by tag, year and quarter.
2) W_XBRL_METRIC_10K_FS 924
Stores each company's metric value by tag and year, filtered by document type is '10-K'. This will have yearly amount and will join with Year dimension.

Figure 10:
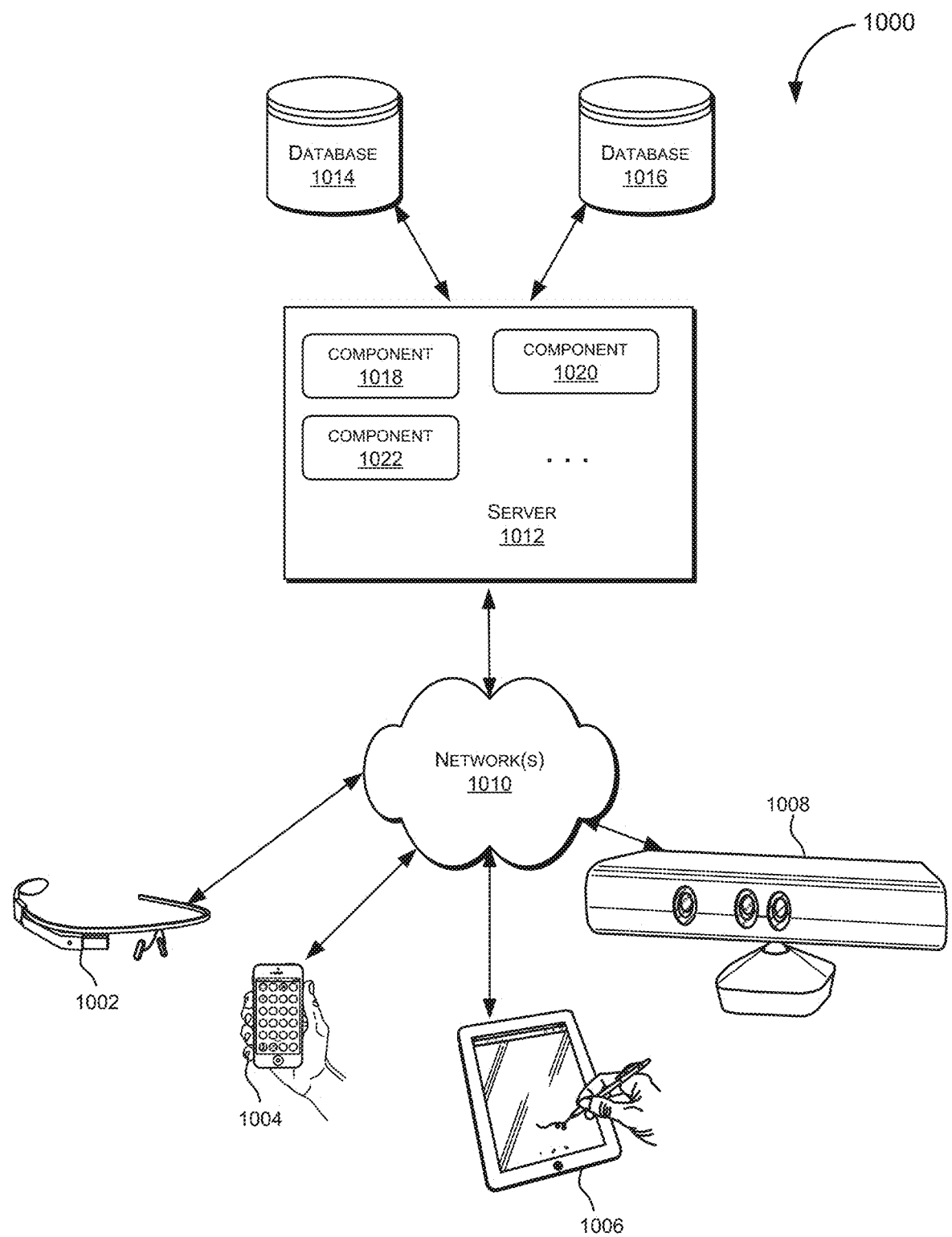
FIG. 10 is a simplified diagram of a distributed comparative reporting system for implementing one of the embodiments.

The Following SDS tables are used for ETL:
XBRL_GROUP_MAPPING
XBRL_GROUP_MASTER
XBRL_METRICS_MAPPING
XBRL_PROCESSED_DATA Exemplary Hardware FIG. 10 depicts a simplified diagram of a distributed comparative reporting system 1000 for implementing one of the embodiments. In the illustrated embodiment, distributed system 1000 includes one or more client computing devices 1002, 1004, 1006, and 1008, which are configured to execute and operate a client application such as a web browser, proprietary client (e.g., Oracle Forms), or the like over one or more network(s) 1010. Server 1012 may be communicatively coupled with remote client computing devices 1002, 1004, 1006, and 1008 via network 1010.

In various embodiments, server 1012 may be adapted to run one or more services or software applications provided by one or more of the components of the system. In some embodiments, these services may be offered as web-based or cloud services or under a Software as a Service (SaaS) model to the users of client computing devices 1002, 1004, 1006, and/or 1008. Users operating client-computing devices 1002, 1004, 1006, and/or 1008 may in turn utilize one or more client applications to interact with server 1012 to utilize the services provided by these components.

In the configuration depicted in the figure, the software components 1018, 1020 and 1022 of system 1000 are shown as being implemented on server 1012. In other embodiments, one or more of the components of system 1000 and/or the services provided by these components may also be implemented by one or more of the client computing devices 1002, 1004, 1006, and/or 1008. Users operating the client computing devices may then utilize one or more client applications to use the services provided by these components. These components may be implemented in hardware, firmware, software, or combinations thereof. It should be appreciated that various different system configurations are possible, which may be different from distributed system 1000. The embodiment shown in the figure is thus one example of a distributed system for implementing an embodiment system and is not intended to be limiting.

Client computing devices 1002, 1004, 1006, and/or 1008 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 100, Palm OS, and the like, and being Internet, e-mail, short message service (SMS), Blackberry®, or other communication protocol enabled. The client computing devices can be general-purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 1002, 1004, 1006, and 1008 may be any other electronic device, such as a thin-client computer, an Internet-enabled gaming system (e.g., a Microsoft Xbox gaming console with or without a Kinect® gesture input device), and/or a personal messaging device, capable of communicating over network(s) 1010.

Although exemplary distributed system 1000 is shown with four client computing devices, any number of client computing devices may be supported. Other devices, such as devices with sensors, etc., may interact with server 1012.

Network(s) 1010 in distributed system 1000 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 1010 can be a local area network (LAN), such as one based at least in part on Ethernet, Token-Ring and/or the like. Network(s) 1010 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol); and/or any combination of these and/or other networks.

Server 1012 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 1012 may be adapted to run one or more services or software applications described in the foregoing disclosure. For example, server 1012 may correspond to a server for performing processing described above according to an embodiment of the present disclosure.

Server 1012 may run an operating system including any of those discussed above, as well as any commercially available server operating system. Server 1012 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 1012 may include one or more applications to analyze and consolidate data feeds and/or event updates received from users of client computing devices 1002, 1004, 1006, and 1008. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1012 may also include one or more applications to display the data feeds and/or real-time events via one or more display devices of client computing devices 1002, 1004, 1006, and 1008.

Distributed system 1000 may also include one or more databases 1014 and 1016. Databases 1014 and 1016 may reside in a variety of locations. By way of example, one or more of databases 1014 and 1016 may reside on a non-transitory storage medium local to (and/or resident in) server 1012. Alternatively, databases 1014 and 1016 may be remote from server 1012 and in communication with server 1012 via a network-based or dedicated connection. In one set of embodiments, databases 1014 and 1016 may reside in a storage-area network (SAN). Similarly, any necessary files for performing the functions attributed to server 1012 may be stored locally on server 1012 and/or remotely, as appropriate. In one set of embodiments, databases 1014 and 1016 may include relational databases, such as databases provided by Oracle, that are adapted to store, update, and retrieve data in response to SQL-formatted commands.

In one embodiment, distributed system 1000 participates in the collection, consolidation and general centralized data processing of business data as a pre-condition to the operation of modern data warehouse systems also known as Business Intelligence (BI) systems and or "Big Data" (BD) systems. In order to analyze and or visualize the data, calculate statistics, compare values, identify or generate key data elements and in general provide modern business reports on business data, a distributed system 1000 incorporates and processes data from one or more remote or external business systems.

Figure 11:
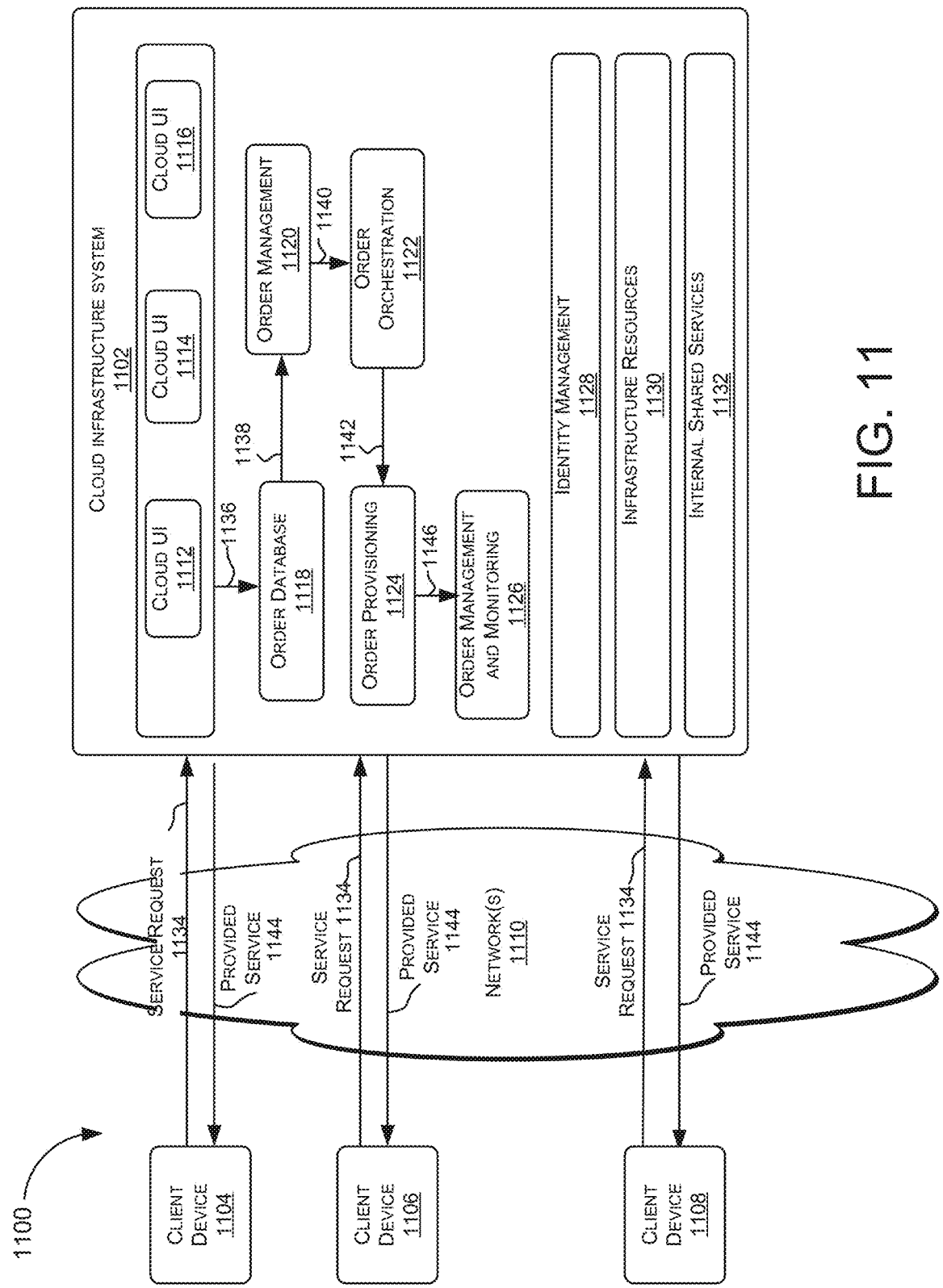
FIG. 11 is a simplified block diagram of components of a system environment by which services provided by the components of an embodiment system may be offered as cloud services, in accordance with an embodiment of the present disclosure.

FIG. 11 is a simplified block diagram of one or more components of a system environment 1100 by which services provided by one or more components of an embodiment system may be offered as cloud services, in accordance with an embodiment of the present disclosure. In the illustrated embodiment, system environment 1100 includes one or more client computing devices 1104, 1106, and 1108 that may be used by users to interact with a cloud infrastructure system 1102 that provides cloud services. The client computing devices may be configured to operate a client application such as a web browser, a proprietary client application (e.g., Oracle Forms), or some other application, which may be used by a user of the client computing device to interact with cloud infrastructure system 1102 to use services provided by cloud infrastructure system 1102.

It should be appreciated that cloud infrastructure system 1102 depicted in the figure may have other components than those depicted. Further, the embodiment shown in the figure is only one example of a cloud infrastructure system that may incorporate an embodiment of the disclosure. In some other embodiments, cloud infrastructure system 1102 may have more or fewer components than shown in the figure, may combine two or more components, or may have a different configuration or arrangement of components.

Client computing devices 1104, 1106, and 1108 may be devices similar to those described above for 1102, 1104, 1106, and 1108.

Although exemplary system environment 1100 is shown with three client computing devices, any number of client computing devices may be supported. Other devices such as devices with sensors, etc. may interact with cloud infrastructure system 1102.

Network(s) 1110 may facilitate communications and exchange of data between clients 1104, 1106, and 1108 and cloud infrastructure system 1102. Each network may be any type of network familiar to those skilled in the art that can support data communications using any of a variety of commercially-available protocols, including those described above for network(s) 1110.

Cloud infrastructure system 1102 may comprise one or more computers and/or servers that may include those described above for server 1112.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1102 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 1102 may be adapted to automatically provision, manage and track a customer's subscription to services offered by cloud infrastructure system 1102. Cloud infrastructure system 1102 may provide the cloud services via different deployment models. For example, services may be provided under a public cloud model in which cloud infrastructure system 1102 is owned by an organization selling cloud services (e.g., owned by Oracle) and the services are made available to the general public or different industry enterprises. As another example, services may be provided under a private cloud model in which cloud infrastructure system 1102 is operated solely for a single organization and may provide services for one or more entities within the organization. The cloud services may also be provided under a community cloud model in which cloud infrastructure system 1102 and the services provided by cloud infrastructure system 1102 are shared by several organizations in a related community. The cloud services may also be provided under a hybrid cloud model, which is a combination of two or more different models.

In some embodiments, the services provided by cloud infrastructure system 1102 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1102. Cloud infrastructure system 1102 then performs processing to provide the services in the customer's subscription order.

In some embodiments, the services provided by cloud infrastructure system 1102 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1102 may also include infrastructure resources 1130 for providing the resources used to provide various services to customers of the cloud infrastructure system. In one embodiment, infrastructure resources 1130 may include pre-integrated and optimized combinations of hardware, such as servers, storage, and networking resources to execute the services provided by the PaaS platform and the SaaS platform.

In some embodiments, resources in cloud infrastructure system 1102 may be shared by multiple users and dynamically re-allocated per demand. Additionally, resources may be allocated to users in different time zones. For example, cloud infrastructure system 1130 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1132 may be provided that are shared by different components or modules of cloud infrastructure system 1102 and by the services provided by cloud infrastructure system 1102. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1102 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1102, and the like.

In one embodiment, as depicted in the figure, cloud management functionality may be provided by one or more modules, such as an order management module 1120, an order orchestration module 1122, an order provisioning module 1124, an order management and monitoring module 1126, and an identity management module 1128. These modules may include or be provided using one or more computers and/or servers, which may be general purpose computers, specialized server computers, server farms, server clusters, or any other appropriate arrangement and/or combination.

In exemplary operation 1134, a customer using a client device, such as client device 1104, 1106 or 1108, may interact with cloud infrastructure system 1102 by requesting one or more services provided by cloud infrastructure system 1102 and placing an order for a subscription for one or more services offered by cloud infrastructure system 1102. In certain embodiments, the customer may access a cloud User Interface (UI), cloud UI 1112, cloud UI 1114 and/or cloud UI 1116 and place a subscription order via these UIs.

The order information received by cloud infrastructure system 1102 in response to the customer placing an order may include information identifying the customer and one or more services offered by the cloud infrastructure system 1102 that the customer intends to subscribe to.

After an order has been placed by the customer, the order information is received via the cloud UIs, 1112, 1114 and/or 1116.

At operation 1136, the order is stored in order database 1118. Order database 1118 can be one of several databases operated by cloud infrastructure system 1118 and operated in conjunction with other system elements.

At operation 1138, the order information is forwarded to an order management module 1120. In some instances, order management module 1120 may be configured to perform billing and accounting functions related to the order, such as verifying the order, and upon verification, booking the order.

At operation 1140, information regarding the order is communicated to an order orchestration module 1122. Order orchestration module 1122 may utilize the order information to orchestrate the provisioning of services and resources for the order placed by the customer. In some instances, order orchestration module 1122 may orchestrate the provisioning of resources to support the subscribed services using the services of order provisioning module 1124.

In certain embodiments, order orchestration module 1122 enables the management of business processes associated with each order and applies business logic to determine whether an order should proceed to provisioning. At operation 1142, upon receiving an order for a new subscription, order orchestration module 1122 sends a request to order provisioning module 1124 to allocate resources and configure those resources needed to fulfill the subscription order. Order provisioning module 1124 enables the allocation of resources for the services ordered by the customer. Order provisioning module 1124 provides a level of abstraction between the cloud services provided by cloud infrastructure system 1100 and the physical implementation layer that is used to provision the resources for providing the requested services. Order orchestration module 1122 may thus be isolated from implementation details, such as whether or not services and resources are actually provisioned on the fly or pre-provisioned and only allocated/assigned upon request.

At operation 1144, once the services and resources are provisioned, a notification of the provided service may be sent to customers on client devices 1104, 1106 and/or 1108 by order provisioning module 1124 of cloud infrastructure system 1102.

At operation 1146, the customer's subscription order may be managed and tracked by an order management and monitoring module 1126. In some instances, order management and monitoring module 1126 may be configured to collect usage statistics for the services in the subscription order, such as the amount of storage used, the amount data transferred, the number of users, and the amount of system up time and system down time.

In certain embodiments, cloud infrastructure system 1100 may include an identity management module 1128. Identity management module 1128 may be configured to provide identity services, such as access management and authorization services in cloud infrastructure system 1100. In some embodiments, identity management module 1128 may control information about customers who wish to utilize the services provided by cloud infrastructure system 1102. Such information can include information that authenticates the identities of such customers and information that describes which actions those customers are authorized to perform relative to various system resources (e.g., files, directories, applications, communication ports, memory segments, etc.) Identity management module 1128 may also include the management of descriptive information about each customer and about how and by whom that descriptive information can be accessed and modified.

Figure 12:
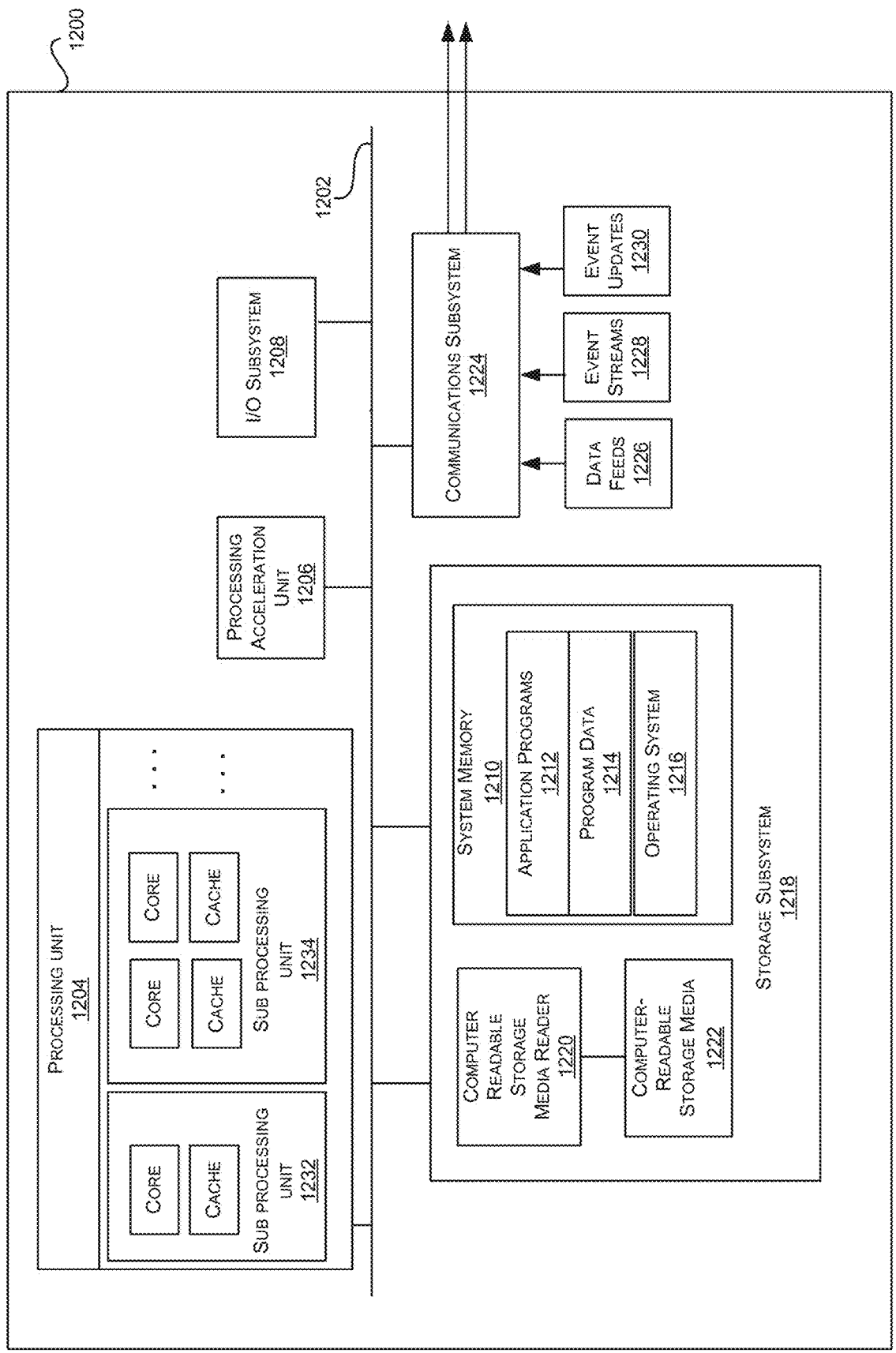
FIG. 12 illustrates an exemplary computer system, in which various embodiments of the present disclosure may be implemented.

FIG. 12 illustrates an exemplary computer system 1200, in which various embodiments of the present disclosure may be implemented. The system 1200 may be used to implement any of the computer systems described above. As shown in the figure, computer system 1200 includes a processing unit 1204 that communicates with a number of peripheral subsystems via a bus subsystem 1202. These peripheral subsystems may include a processing acceleration unit 1206, an I/O subsystem 1208, a storage subsystem 1218 and a communications subsystem 1224. Storage subsystem 1218 includes tangible computer-readable storage media 1222 and a system memory 1210.

Bus subsystem 1202 provides a mechanism for letting the various components and subsystems of computer system 1200 communicate with each other as intended. Although bus subsystem 1202 is shown schematically as a single bus, alternative embodiments of the bus subsystem may utilize multiple buses. Bus subsystem 1202 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1204, which can be implemented as one or more integrated circuits (e.g., a conventional microprocessor or microcontroller), controls the operation of computer system 1200. One or more processors may be included in processing unit 1204. These processors may include single core or multicore processors. In certain embodiments, processing unit 1204 may be implemented as one or more independent processing units 1232 and/or 1234 with single or multicore processors included in each processing unit. In other embodiments, processing unit 1204 may also be implemented as a quad-core processing unit formed by integrating two dual-core processors into a single chip.

In various embodiments, processing unit 1204 can execute a variety of programs in response to program code and can maintain multiple concurrently executing programs or processes. At any given time, some or all of the program code to be executed can be resident in processor(s) 1204 and/or in storage subsystem 1218. Through suitable programming, processor(s) 1204 can provide various functionalities described above. Computer system 1200 may additionally include a processing acceleration unit 1206, which can include a digital signal processor (DSP), a special-purpose processor, and/or the like.

I/O subsystem 1208 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1200 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1200 may comprise a storage subsystem 1218 that comprises software elements, shown as being currently located within a system memory 1210. System memory 1210 may store program instructions that are loadable and executable on processing unit 1204, as well as data generated during the execution of these programs.

Depending on the configuration and type of computer system 1200, system memory 1210 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1204. In some implementations, system memory 1210 may include multiple different types of memory, such as static random access memory (SRAM) or dynamic random access memory (DRAM). In some implementations, a basic input/output system (BIOS), containing the basic routines that help to transfer information between elements within computer system 1200, such as during start-up, may typically be stored in the ROM. By way of example, and not limitation, system memory 1210 also illustrates application programs 1212, which may include client applications, Web browsers, mid-tier applications, relational database management systems (RDBMS), etc., program data 1214, and an operating system 1216. By way of example, operating system 1216 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 12 OS, and Palm® OS operating systems.

Storage subsystem 1218 may also provide a tangible computer-readable storage medium for storing the basic programming and data constructs that provide the functionality of some embodiments. Software (programs, code modules, instructions) that when executed by a processor provide the functionality described above may be stored in storage subsystem 1218. These software modules or instructions may be executed by processing unit 1204. Storage subsystem 1218 may also provide a repository for storing data used in accordance with the present disclosure.

Storage subsystem 1200 may also include a computer-readable storage media reader 1220 that can further be connected to computer-readable storage media 1222. Together and, optionally, in combination with system memory 1210, computer-readable storage media 1222 may comprehensively represent remote, local, fixed, and/or removable storage devices plus storage media for temporarily and/or more permanently containing, storing, transmitting, and retrieving computer-readable information.

Computer-readable storage media 1222 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1200.

By way of example, computer-readable storage media 1222 may include a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM, DVD, and Blu-Ray® disk, or other optical media. Computer-readable storage media 1222 may include, but is not limited to, Zip® drives, flash memory cards, universal serial bus (USB) flash drives, secure digital (SD) cards, DVD disks, digital video tape, and the like. Computer-readable storage media 1222 may also include, solid-state drives (SSD) based at least in part on non-volatile memory such as flash-memory based SSDs, enterprise flash drives, solid state ROM, and the like, SSDs based at least in part on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1200.

Communications subsystem 1224 provides an interface to other computer systems and networks. Communications subsystem 1224 serves as an interface for receiving data from and transmitting data to other systems from computer system 1200. For example, communications subsystem 1224 may enable computer system 1200 to connect to one or more devices via the Internet. In some embodiments communications subsystem 1224 can include radio frequency (RF) transceiver components for accessing wireless voice and/or data networks (e.g., using cellular telephone technology, advanced data network technology, such as 3G, 6G or EDGE (enhanced data rates for global evolution), WiFi (IEEE 1002.11 family standards, or other mobile communication technologies, or any combination thereof), global positioning system (GPS) receiver components, and/or other components. In some embodiments communications subsystem 1224 can provide wired network connectivity (e.g., Ethernet) in addition to or instead of a wireless interface.

In some embodiments, communications subsystem 1224 may also receive input communication in the form of structured and/or unstructured data feeds 1226, event streams 1228, event updates 1230, and the like on behalf of one or more users who may use computer system 1200.

By way of example, communications subsystem 1224 may be configured to receive data feeds 1226 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1224 may also be configured to receive data in the form of continuous data streams, which may include event streams 1228 of real-time events and/or event updates 1230, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1224 may also be configured to output the structured and/or unstructured data feeds 1226, event streams 1228, event updates 1230, and the like to one or more databases that may be in communication with one or more streaming data source computers coupled to computer system 1200.

Computer system 1200 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1200 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based at least in part on the disclosure and teachings provided herein, a person of ordinary skill in the art will appreciate other ways and/or methods to implement the various embodiments.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method, comprising:
   receiving, by a computing system, a financial report made of a first organization reporting first financial information, the financial report structured according to a predetermined reporting language;
   processing, by the computing system, the financial report to extract the first financial information using a set of data rules;
   integrating, by the computing system, the extracted first financial information with second financial information from a second organization;
   receiving, at the computing system, a plurality of comparison metrics comprising at least a derived metric and a base metric, the derived metric being calculated based at least in part on the base metric, and the base metric being pre-defined in a repository database (RPD);
   predicting, based at least in part on a machine learning (ML) heuristic, a closest match metric for a tag among the derived metric and the base metric of the plurality of comparison metrics, a name of the closest match metric differing from the tag and from a different tag associated with a different organization, the different tag also predicted to match to the closest match metric;
   performing, by the computing system and based at least in part on the closest match metric, one or more comparative analytics between the extracted first financial information for the first organization and the second financial information for the second organization using the one or more comparative metrics; and
   generating, by the computing system, comparison information transforming the first financial information for the first organization and the second financial information for the second organization into a format indicative of results of the one or more comparative analytics.

2. The computer-implemented method of claim 1, wherein the predetermined reporting language comprises eXtensible Business Reporting Language (XBRL).

3. The computer-implemented method of claim 1, wherein the financial report is received from a Securities Exchange Commission (SEC) server.

4. The computer-implemented method of claim 3, wherein the first financial information comprises publically available information published on a web page served by the SEC server.

5. The computer-implemented method of claim 1, wherein processing the financial report to extract the first financial information using the set of data rules comprises:
   partitioning the first financial information into a plurality of slices, a respective slice partitioning the first financial information into one or more logical sets; and
   extracting the first financial information according to the plurality of slices, the extracted first financial information comprising a key-value pair sliced according to the plurality of slices.

6. The computer-implemented method of claim 1, wherein integrating the extracted first financial information with the second financial information from the second organization comprises executing a data flow that stores the first financial information and the second financial information in a data warehouse.

7. The computer-implemented method of claim 1, wherein integrating the extracted first financial information with the second financial information from the second organization comprises executing a data flow between a relational database and a data warehouse, wherein the extracted first financial information is mapped to one or more database tables using the data rules, wherein a replicator orchestrates a replication process between an extractor and a loader configured to load the extracted first financial information to a target comprising an eXtensible Business Reporting Language (XBRL) Source-Dependent Schema (SDS), and wherein XBRL data is processed in the SDS during a data integration process.

8. The computer-implemented method of claim 1:
further comprising:
storing XML data in a relational database as a Binary Large Object (BLOB); and
using, by a data integration flow, an Extract Transform Load (ETL) job sourcing data staged in tables of the relational database, the ETL job further targeting business intelligence (BI) warehouse tables; and
wherein predicting the closest match metric for the tag further comprises scanning the BLOB comprising the XML data and extracting the base metrics and/or the derived metrics.

9. The computer-implemented method of claim 1, further comprising onboarding the received plurality of comparison metrics into a business intelligence (BI) infrastructure comprising the repository database (RPD), the RPD including:
a physical layer representing tables and columns of a database;
a connection definition to the database;
a business model mapping layer defined in the physical layer; and
a presentation layer configured to organize comparative content for users and present the tables and columns to reports in an updated dashboard displayed in a user interface of a BI platform.

10. The computer-implemented method of claim 1, wherein a data integration repository comprises a master repository and a work repository, the master repository containing topology and security properties and connection information to the work repository, and the work repository containing development and run-time data.

11. The computer-implemented method of claim 1, wherein a staging table stores a plurality of values of the closest match metric for a plurality of organizations comprising the first organization and the second organization by tag, year, and quarter, the plurality of values extracted from SDS tables and loaded to target fact and dimension tables.

12. A system, comprising:
a memory configured to store computer-executable instructions; and
a processor configured to access the memory and execute the computer-executable instructions to at least:
receive a financial report made of a first organization reporting first financial information, the financial report structured according to a predetermined reporting language;
process the financial report to extract the first financial information using a set of data rules;
integrate the extracted first financial information with second financial information from a second organization;
receive a plurality of comparison metrics comprising at least a derived metric and a base metric, the derived metric being calculated based at least in part on the base metric, and the base metric being pre-defined in a repository database (RPD);
predict, based at least in part on a machine learning (ML) heuristic, a closest match metric for a tag among the derived metric and the base metric of the plurality of comparison metrics, a name of the closest match metric differing from the tag and from a different tag associated with a different organization, the different tag also predicted to match to the closest match metric;
perform, based at least in part on the closest match metric, one or more comparative analytics between the extracted first financial information for the first organization and the second financial information for the second organization using the one or more comparative metrics; and
generate comparison information transforming the first financial information for the first organization and the second financial information for the second organization into a format indicative of results of the one or more comparative analytics.

13. The system of claim 12, wherein the predetermined reporting language comprises eXtensible Business Reporting Language (XBRL).

14. The system of claim 12, wherein processing the financial report to extract the first financial information using the set of data rules comprises:
partitioning the first financial information into a plurality of slices, a respective slice partitioning the first financial information into one or more logical sets; and
extracting the first financial information according to the plurality of slices, the extracted first financial information comprising a key-value pair sliced according to the plurality of slices.

15. The system of claim 12, wherein integrating the extracted first financial information with the second financial information from the second organization comprises executing a data flow between a relational database and a data warehouse, wherein the extracted first financial information is mapped to one or more database tables using the data rules, wherein a replicator orchestrates a replication process between an extractor and a loader configured to load the extracted first financial information to a target comprising an eXtensible Business Reporting Language (XBRL) Source-Dependent Schema (SDS), and wherein XBRL data is processed in the SDS during a data integration process.

16. A non-transitory computer-readable storage medium configured to store computer-executable instructions that, when executed by one or more processors, configure the one or more processors to perform operations comprising:
receiving a financial report made of a first organization reporting first financial information, the financial report structured according to a predetermined reporting language;
processing the financial report to extract the first financial information using a set of data rules;
integrating the extracted first financial information with second financial information from a second organization;
receiving a plurality of comparison metrics comprising a custom function, the plurality of comparison metrics further comprising at least a derived metric and a base metric, the derived metric being calculated based at least in part on the base metric, and the base metric being pre-defined in a repository database (RPD);

predicting, based at least in part on a machine learning (ML) heuristic, a closest match metric for a tag among the derived metric and the base metric of the plurality of comparison metrics, a name of the closest match metric differing from the tag and from a different tag associated with a different organization, the different tag also predicted to match to the closest match metric;

performing one or more comparative analytics based at least in part on the custom function and that derive a comparative result from evaluating a plurality of elements between the extracted first financial information for the first organization and the second financial information for the second organization using the one or more comparative metrics; and generating comparison information transforming the first financial information for the first organization and the second financial information for the second organization into a format indicative of results of the one or more comparative analytics.

17. The non-transitory computer-readable storage medium of claim 16, wherein the predetermined reporting language comprises eXtensible Business Reporting Language (XBRL).

18. The non-transitory computer-readable storage medium of claim 16, wherein processing the financial report to extract the first financial information using the set of data rules comprises:

partitioning the first financial information into a plurality of slices, a respective slice partitioning the first financial information into one or more logical sets; and extracting the first financial information according to the plurality of slices, the extracted first financial information comprising a key-value pair sliced according to the plurality of slices.

19. The non-transitory computer-readable storage medium of claim 16, wherein integrating the extracted first financial information with the second financial information from the second organization comprises executing a data flow between a big data source and a data warehouse, wherein the extracted first financial information is stored in key-value pairs, and wherein the key-value pairs are mapped to tables of the repository database (RPD).

20. The non-transitory computer-readable storage medium of claim 16, wherein integrating the extracted first financial information with the second financial information from the second organization comprises executing a data flow between a relational database and a data warehouse, wherein the extracted first financial information is mapped to one or more database tables using the data rules, wherein a replicator orchestrates a replication process between an extractor and a loader configured to load the extracted first financial information to a target comprising an eXtensible Business Reporting Language (XBRL) Source-Dependent Schema (SDS), and wherein XBRL data is processed in the SDS during a data integration process.

* * * * *